United States Patent [19]

Dehari et al.

[11] Patent Number: 4,774,866

[45] Date of Patent: Oct. 4, 1988

[54] BLADE GUARD ARRANGEMENT IN MOTOR-DRIVEN CHOP SAW

[75] Inventors: Tomoshige Dehari, Hiroshima; Kouichi Miyamoto, Fuchu, both of Japan

[73] Assignee: Ryobi Ltd., Hiroshima, Japan

[21] Appl. No.: 141,412

[22] Filed: Jan. 7, 1988

[30] Foreign Application Priority Data

Jan. 12, 1987 [JP] Japan .............................. 62-3258[U]

[51] Int. Cl.⁴ ......................... B23D 19/00; B26D 1/14

[52] U.S. Cl. ........................................ 83/478; 83/490; 83/397; 83/DIG. 1; 30/391; 144/251 R

[58] Field of Search ................. 83/478, 490, 397, 546, 83/481, 484, 581, DIG. 1; 30/390, 391; 144/251 R, 251 A, 251 B, 216

[56] References Cited

U.S. PATENT DOCUMENTS

| | | | |
|---|---|---|---|
| 1,711,490 | 5/1929 | Drummond | 83/478 |
| 1,900,553 | 3/1933 | Hampton | 83/397 |
| 2,737,985 | 3/1956 | Utz | 30/391 |
| 3,922,785 | 12/1975 | Fushiya | 83/478 |
| 4,002,094 | 1/1977 | Erickson et al. | 83/471.3 |
| 4,028,975 | 6/1977 | Bennett | 83/490 |
| 4,176,571 | 12/1979 | Batson | 83/397 |
| 4,318,324 | 3/1982 | Hall et al. | 83/397 |
| 4,489,633 | 12/1984 | van de Wouw | 83/478 |
| 4,581,966 | 4/1986 | Kaiser et al. | 83/397 |

FOREIGN PATENT DOCUMENTS

| | | | |
|---|---|---|---|
| 631535 | 8/1982 | Czechoslovakia | 83/478 |
| 2248512 | 6/1973 | Fed. Rep. of Germany | 30/391 |

*Primary Examiner*—Frank T. Yost
*Assistant Examiner*—Scott A. Smith
*Attorney, Agent, or Firm*—Parkhurst, Oliff & Berridge

[57] ABSTRACT

A saw-blade guard arrangement in a motor driven chop saw which includes a new unit pivotally mounted for movement between an upper rest position and a lower operational position. The saw unit is pivotably connected to a hinging member through a pivot shaft, and the unit includes an upper safety guard, a motor casing integral with the upper guard, a saw blade fixed to a drive shaft connected to a motor shaft, and a lower guard rotatable to a first direction for covering a part of the saw blade when the saw unit is in the upper rest position and rotatable to a second direction when the unit is moved to the lower operational position. The blade guard arrangement comprises a first biasing means disposed between the upper safety guard and the hinging member, an operation arm having one end portion pivotally rotatable about the pivot shaft, a link member having one end pivotably connected to the other end of the operation arm and having the other end pivotally connected to the lower guard, a second biasing means disposed between the operation arm and the hinging member, and an adjusting means for controlling orientation of the operation arm.

5 Claims, 5 Drawing Sheets

BLADE GUARD ARRANGEMENT IN MOTOR-DRIVEN CHOP SAW

BACKGROUND OF THE INVENTION

The present invention relates to a blade guard arrangement in a motor driven chop saw, and more particularly to a lower blade guard arrangement in the chop saw which is pivotally mounted for movement between a raised rest position and a lowered operational position.

The chop saw generally provides an upper safety guard which partially encases a circular saw-blade, and a swingable lower blade guard which covers the exposed segment of the saw-blade when the saw is in the raised rest position. When the upper safety guard is pivotally moved to the lowered operational position about a pivot shaft, the swingable lower blade guard is rotated to expose the saw-blade segment so as to chop wood or metal member mounted on a saw table with the circular sawblade. Such arrangement is well known in the art.

Further, according to one of the conventional arrangement, in response to the pivotal movements of the upper safety guard together with the circular sawblade, the lower guard is pivotted by way of an actuation lever. In the latter type of arrangement, the actuation lever has one end portion pivotably connected to a frame element through a slide hinge which includes a pivot bolt engaged with a slot, and has the other end pivotally connected to the lower guard. Further, a tension springs are disposed each between the frame element and the upper blade guard in order to bias the upper blade guard and the circular saw-blade toward upper rest position. Such an arrangement is disclosed in U.S. Pat. No. 4,581,966.

With the structure, it would be rather troublesome to pivot the lower guard for exposing the saw-blade when the saw unit is at the upper rest position, if maintenance or changing of the saw-blade is required. More specifically, it is necessary to axially move the pivot bolt so as to allow actuation lever to slide along the pivot bolt in order to raise the lower blade guard without moving the saw unit from its rest position.

Further, with the structure, it would be impossible to adjust angular position of the lower guard so as to control a covering range with respect to the blade segment when the saw unit is in the rest position. Therefore, if the saw unit is assembled with having dimensional errors of the mechanical segments, the exposed blade portion is not sufficiently covered with the lower guard at the rest position. In order to avoid this problem, high dimensional accuracy is required for the assembly, which however is costly and requires nervous assembling labour.

SUMMARY OF THE INVENTION

It is therefore, an object of the present invention to overcome the above-described drawbacks and to provide an improved blade guard arrangement in a motor driven circular saw.

Another object of this invention is to provide such arrangement which facilitates pivotal movement of the lower blade guard when the saw unit is at its upper rest position.

Still another object of this invention is to provide such arrangement capable of controlling covering zone of the lower blade guard with respect to the blade segment which is not covered with the upper blade guard.

In a motor driven chop saw, there are generally provided a saw table, a hinging member extending from the saw table and having a pivot shaft, and a saw unit pivotally movable with respect to the hinging member. The saw unit includes an upper safety guard for partially encasing the saw blade, the upper safety guard pivotably connected to the hinging member through the pivot shaft, a motor casing integrally connected to the upper safety guard, a motor housed in the motor casing, a drive shaft connected to the motor and fixing the sawblade for its rotation, and a lower guard rotatable to a first direction for covering an exposed segment of the saw blade when the saw unit is in the upper rest position and rotatable to a second direction for uncovering said segment when the saw-unit is moved to the lowered operational position. A sawblade guard arrangement according to the present invention comprises a first biasing means, an operation arm, a link member, a second biasing means, and an adjusting means. The first biasing means is disposed between the upper safety guard and the hinging member for urging the upper safety guard toward its upper rest position. The operation arm has one end portion pivotally rotatable about the pivot shaft. The link member has one end pivotally connected to the other end of the operation arm, and has the other end pivotally connected to the lower guard, the lower guard being pivotally connected to a bearing portion of the drive shaft. The second biasing means is disposed between the operation arm and the hinging member for urging the operation arm to a direction for urging the lower guard to the first direction. The adjusting means is adapted for controlling orientation of the operation arm. The adjusting means is provided on the hinging member at a position adjacent an end face of the one end portion of the operation arm.

BRIEF DESCRIPTION OF THE DRAWINGS

In the drawings;

FIG. 2(*b*) is a cross-sectional view taken along the line II—II of FIG. 1;

DESCRIPTION OF THE PREFERRED EMBODIMENT

Figure 3:
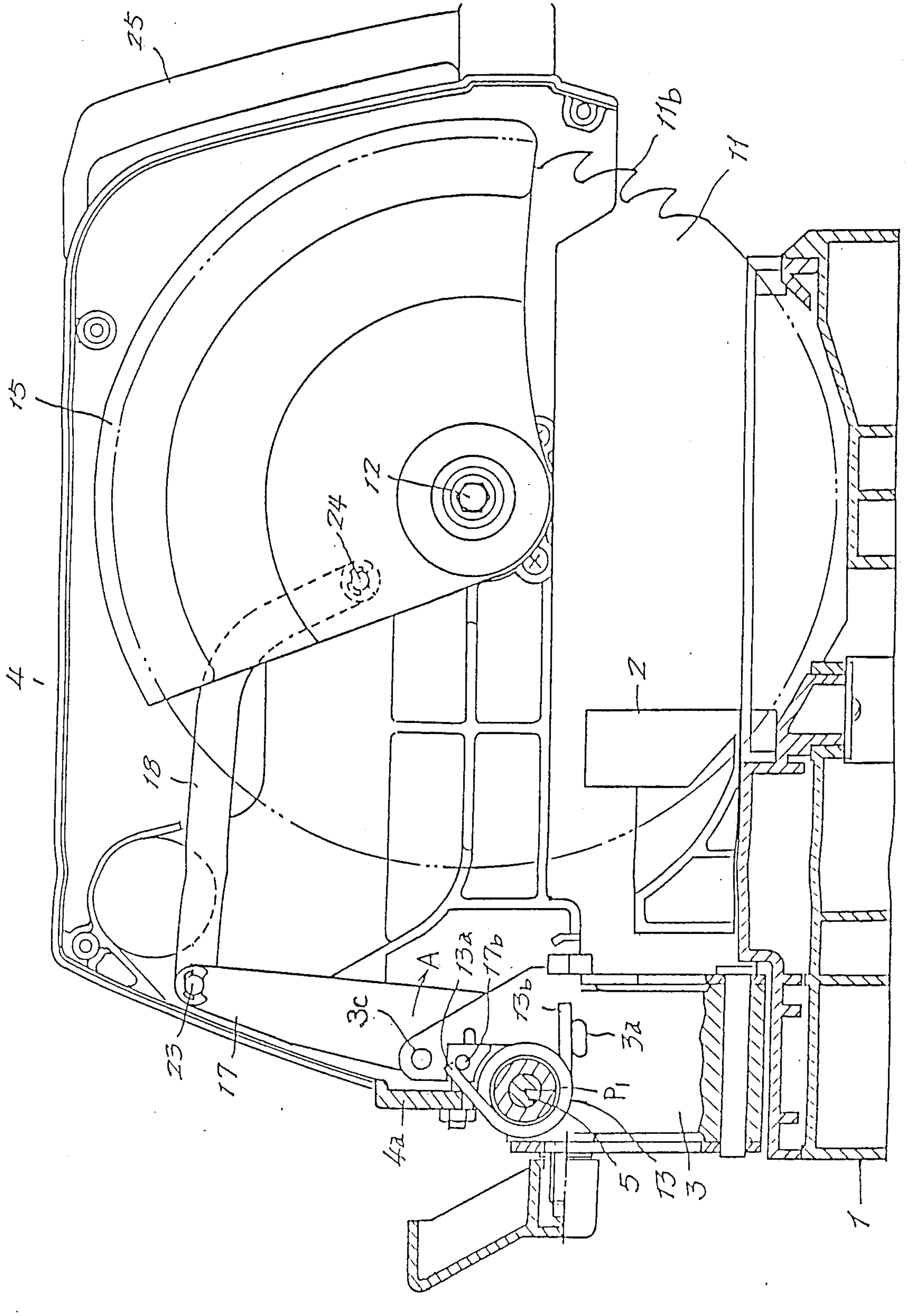
FIG. 3 is a side view partially crosssectioned showing a lower operational position of the saw unit according to the embodiment.

One embodiment according to the present invention will be described with reference to accompanying drawings. A saw table 1 mounts a workpiece stop 2 thereon, and pivotally mounts a hinging member 3 which is pivotable about a pivot axis $P_2$ at a position outside the workpiece stop 2. A saw-unit 50 is pivotably mounted on the saw table 1 for movement between a raised rest position (FIG. 1) and a lowered operational position (FIG. 3). More specifically, the saw unit 50 includes an upper safety guard 4 which is integrally provided with a motor 7, a motor casing 6, a reduction gear mechanism 8, circular saw blade 11, and a lower blade guard 15. The upper safety guard 4 partially encases the blade 11, and the lower guard 15 immovably encases the exposed portion of the saw blade 11 when the saw-unit is in the upper rest position. Such structure is generally known in this art.

In the present invention, a base end portion 4b of the upper safety guard 4 is pivotably mounted to the hinging member 3 through a pivot shaft 5 including a bolt and a nut, so that the saw unit 50 is pivotable in vertical direction. The upper guard 4 is pivotable about a pivot axis $P_1$ extending perpendicular to the pivot axis $P_2$. Further, a torsion spring 13 (first biasing means) is provided to urge the saw unit 50 toward upper rest position. The torsion spring 13 has one end 13a secured to an inner end face 4a of a rear wall of the upper safety guard 4, and has the other end 13b secured to a spring seat 3a projecting from the hinging member 3. The spring 13 is disposed over the pivot shaft 5.

Figure 5:
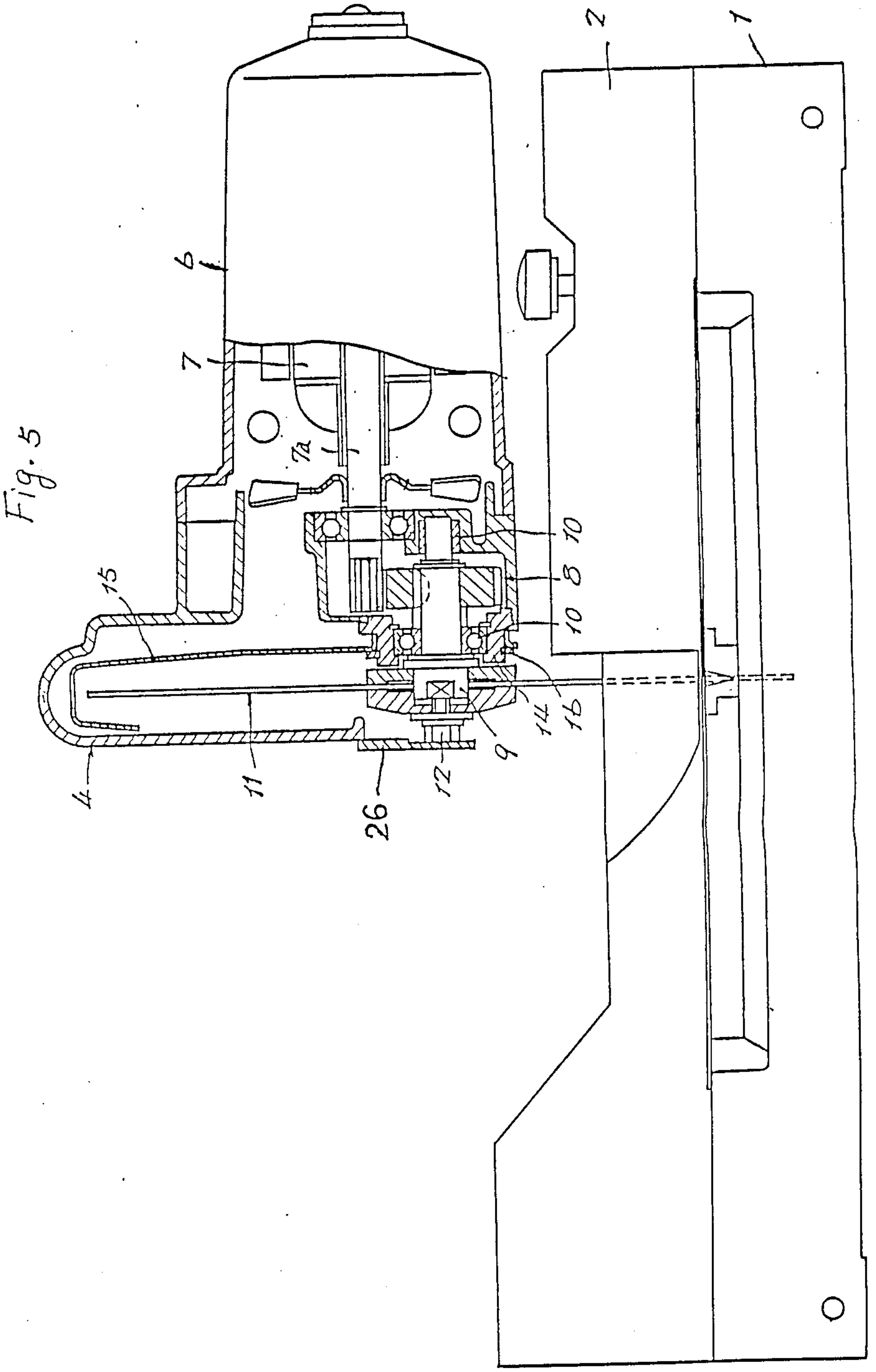

As shown in FIG. 5, the motor casing 6 is secured to an external end face of the upper safety guard 4. In the motor casing 6, there is provided the drive motor 7 whose motor shaft 7a is drivingly connected to a saw blade drive shaft 9 through the reduction gear mechanism 8. The drive shaft 9 extends through the circular saw blade 11, and is rotatably supported by bearings 10. Planar end of the drive shaft projects out of the blade 11 and the blade 11 is detachably secured thereto by a fastening bolt 12 threadingly engaged with the end portion of the shaft 9. A cylindrical bushing 14 is disposed over the drive shaft 9 for supporting the same, and the lower guard 15 is rotatably mounted over the cylindrical bushing 14. Further, a stop ring 16 is fixed to the bushing 14 to prevent the lower guard 15 from its axial displacement and disassembly.

As shown in FIG. 5, in the operational position of the saw unit 50, generally upper half portion of the blade 11 is encased by the upper safety guard 4, and remaining lower half portion 11b thereof is exposed to thereby perform sawing or chopping operation to a workpiece (not shown) mounted on the saw table 1.

The lower guard 15 has a sufficient circumferential length for covering the exposed portion 11b of the saw blade 11. The lower guard 15 is of sector shape and has U-shape cross-section at its radially outermost portion as shown in FIG. 5. The lower guard 15 is pivotable about an axis of the drive shaft 9. That is, the lower guard 15 is moved to cover the exposed portion 11b when the saw unit 50 is at its upper rest position, and is moved to expose the portion 11b when the saw unit is at its lower operational position. Such movement is generally achieved by an operation arm 17, a link 18 and a torsion spring 20.

The operation arm 17 has a lower end portion pivotable about the pivot shaft 5 and an upper end portion pivotably connecting one end portion of the link 18 through a pin 23. The other end portion of the link 18 is pivotally connected to the lower guard 15 through a pin 24. The position of the pin 24 is offset from the drive shaft 9.

Figure 2B:
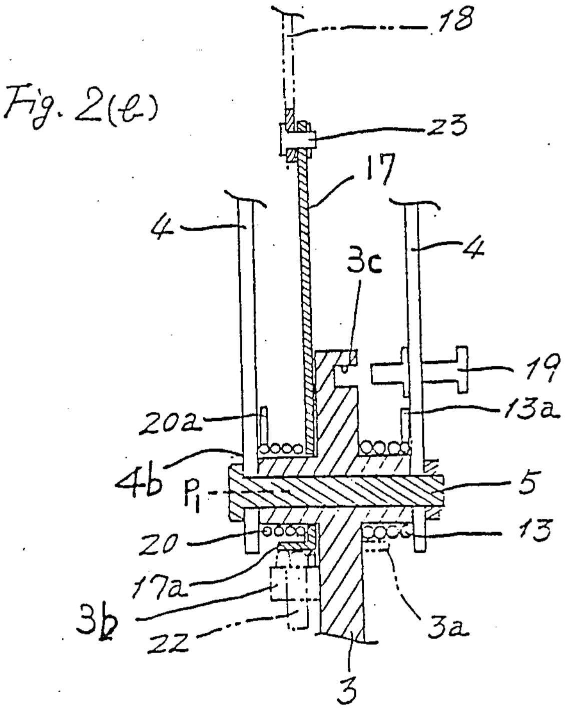
FIG. 2(*a*) is a plan view of an embodiment shown in FIG. 1 in its operational position.
Figure 2A:
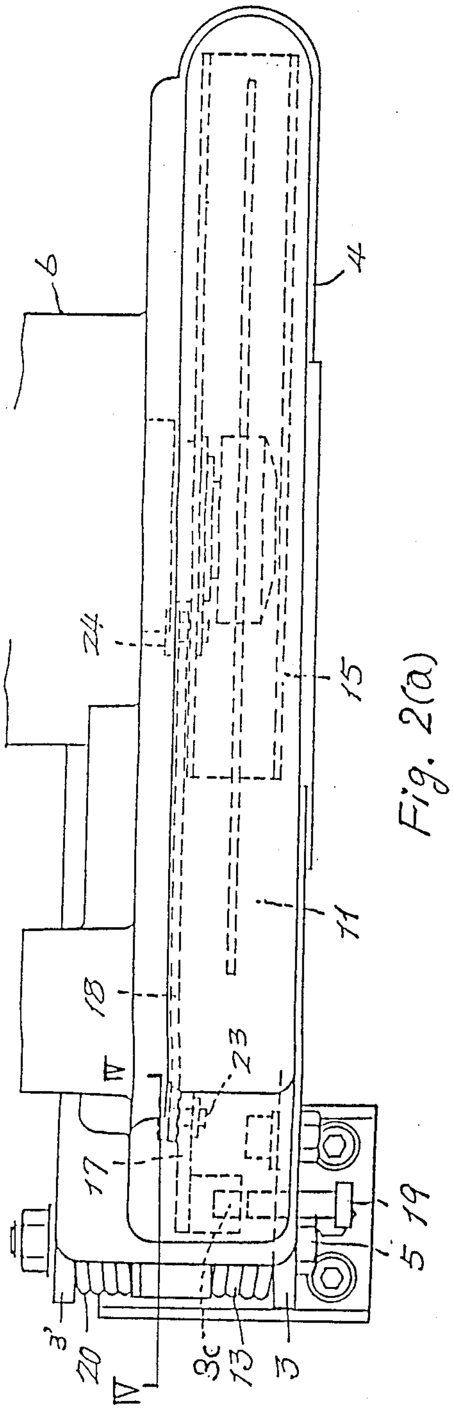
Figure 4:
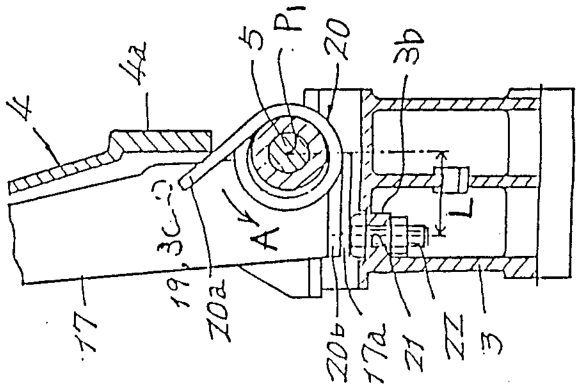
FIG. 4 is a cross-sectional view taken along the line IV—IV of FIG. 2(*a*); and, FIG. 5 is a front view partially crosssectioned showing a lower operational position of the saw unit according to the embodiment.

As is apparent from the above, pivot axis of the operation arm 17 is coincident with that of the upper safety guard 4, i.e., the axis $P_1$ of the pivot shaft 5. As shown in FIGS. 2(*b*) and 4, a second torsion spring 20 (second biasing means) is disposed over the pivot shaft 5. The second spring 20 has one end 20a secured to an inner face of the rear wall 4a of the upper safety guard 4, and the other end 20b secured to a bottom wall 17a of the lower end portion of the operation arm 17. Therefore, the second spring 20 urges the operation arm 17 toward a direction shown by an arrow A in FIGS. 3 and 4, as well as urges the upper safety guard toward its upper rest position, the latter function being the same as that derived from the first spring 13.

Further, in the present invention, provided is an adjusting means for adjusting orientation of the operation arm 17. The adjusting means includes an adjusting bolt 22 extending in vertical direction. The adjusting bolt 22 is threadingly engaged with a female thread 21 formed in a rib 3b of the hinging member 3 as shown in FIGS. 2(*b*) and 4. The rib 3b confronts a bottom wall 17a of the operation arm 17, and is positioned closer to the blade 11 than the pivot axis $P_1$ by a length L. Therefore, a head of the bolt 22 is in abutment with the bottom wall 17a portion which is positioned closer to the blade 11 than the remaining bottom wall portion (see FIG. 4). Since the operation arm 17 is urged toward a direction A by the second spring 20, i.e., since the bottom wall 17a is normally urged toward the bolt head, the inclination of the operation arm 17 is controllable and the inclination is maintainable by axial displacement of the bolt 22 relative to the rib 3a. That is, the operation arm 17 is rotated to a direction A or to a inverse direction by the treading movement of the bolt 22.

Incidentally, as shown, a locking pin 19 is slidably provided to the upper safety guard 4, and a recess 3c is formed in the hinging member 3. The locking pin 19 is engageable with the recess 3c in order to maintain the lower operational position of the upper safety guard 4. Further, a handle 25 is provided on the upper safety guard 4 at a position opposite the base end portion 4b so as to manually pivot the saw unit 50. A cover plate 26 (FIG. 5) is secured to the safety guard 4 and over the bolt 12.

In operation, when an operator manually rotate the upper safety guard 4 in a direction A by gripping and pushing down the handle 25, the lower guard 15 is pivoted in a direction shown by an arrow B (counterclockwise direction in FIG. 1) by way of the stationarily held operation arm 17 and the movable link 18. In this case, entire lower guard 15 is moved downwardly together with the downward movement of the saw unit 50. However, downward movement of the lower guard 15 is restrained by the link 18, since the link 18 is connected to the lower guard 15 at the pivot pin 24 positioned offset the drive shaft 9. Therefore, the lower guard 15 is brought into a position shown in FIG. 3 in which the saw blade 11 is exposed by a portion 11b, to thus perform sawing operation.

Figure 1:
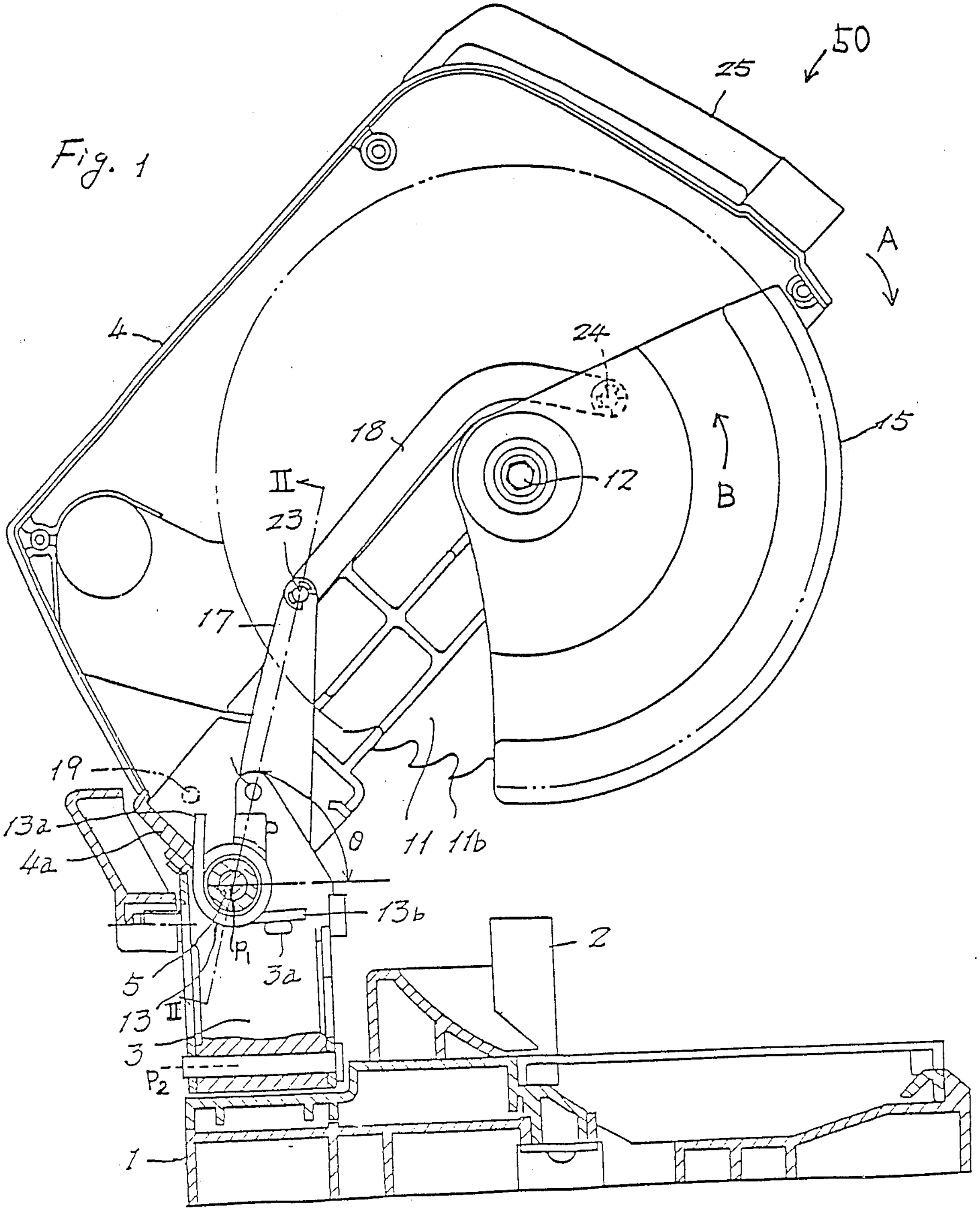
FIG. 1 is a side view partially crosssectioned showing a blade guard arrangement in a saw unit in its upper rest position according to one embodiment of the present invention.

When the saw unit 50 is moved upwardly to a position shown in FIG. 1, the lower guard 15 encases the exposed blade portion 11b by way of pivotal linkage between the link 18 and the lower guard 15. In this state, if maintenance or changing of the saw-blade is required, the operator manually grips the lower guard 15 and can rotate the lower guard 15 in the direction B. In other words, the operation arm 17 is indirectly forcibly pivoted to a direction opposite the direction A against biasing force of the second spring 20, so that angular positional relationship between the operation arm 17 and the link 18 is changed to allow rotation of the lower guard in a direction B. Therefore, the blade portion 11b can be exposed for conducting its changing etc. If the operator relaxes his hand, the operation arm 17 is moved to a direction A to restore its original position by biasing force of the spring 20, so that the lower guard 15 again encases the exposed blade portion 11b.

Regarding the adjusting means for adjusting covering position of the lower guard 15 relative to the exposed blade portion 11b in the upper rest position of the saw unit 50, the covering range of the lower guard 15 is determinative by an angle $\theta$ (FIG. 1) defined by a horizontal line passing though the pivot axis $P_1$ and a line connecting between the pivot axis $P_1$ and an axis of the pivot pin 23. However, as described above, this angle would be changable due to minute dimensional errors in each of the mechanical segments and due to inaccurate assembly, thereby varying covering range of the lower guard 15 with respect to the saw-blade 11. However, in the present invention, the adjusting bolt 22 urges the bottom wall **17*a* of the operation arm 17 to pivot the same about the pivot shft 5, and the pivot angle is maintainable by the biasing force of the spring 20**. Therefore, in the present invention, optimum angle $\theta$ can be provided.

In view of the foregoing, according to the present invention, the operation arm 17 is spring-biased by the spring 20, and the operation arm 17 has one end portion pivotally connected to the hinging member 3, and the other end portion pivotally connected to the one end of the link 18, and other end of the link 18 is pivotally connected to the lower guard 15. As a result, the lower guard is normally urged toward a downward direction to cover the saw-blade 11 in the upper rest position of the saw-unit, and the lower guard 15 is also rotatable toward the upward direction against biasing force of the spring 20 for facilitating inspection and changing of the saw blade with minimized period of time.

Further, in the present invention, since the above described angle $\theta$ is controllable, the lower guard can sufficiently cover the saw-blade regardless of the dimensional error of the mechanical segments. In other words, easy assembling work is achievable yet providing sufficient encasing of the saw blade by the lower guard.

While the invention has been described with reference to a specific embodiment, it would be apparent for those skilled in the art that various changes and modifications can be made therein without departing from the spirit and scope of the invention.

What is claimed is:

1. A saw-blade guard arrangement in a motor driven chop saw, said chop saw including a saw table; a hinging member extending from said saw table and having a pivot shaft; and a saw unit pivotally movable with respect to said hinging member; said saw unit including a sawblade, an upper safety guard for partially encasing said saw blade, said upper safety guard pivotably connected to said hinging member through said pivot shaft, a motor casing connected to said upper safety guard, a motor housed in said motor casing, a drive shaft connected to said motor and fixing said saw-blade for its rotation, and a lower guard rotatable to a first direction for covering an exposed segment of said saw blade when said saw unit is in the upper rest position and rotatable to a second direction for uncovering said segment when the saw-unit is moved to the lowered operational position, said saw-blade guard arrangement comprising:

- a first biasing means disposed between said upper safety guard and said hinging member for urging said upper safety guard toward its upper rest position;
- an operation arm having one end portion pivotally rotatable about said pivot shaft;
- a link member having one end pivotally connected to other end of said operation arm, and having the other end pivotally connected to said lower guard, said lower guard being rotatably connected to a bearing portion of said drive shaft;
- a second biasing means disposed between said operation arm and said hinging member for urging said operation arm to a direction for urging said lower guard to said first direction; and,
- an adjusting means for controlling orientation of said operation arm, said adjusting means being provided on said hinging member at a position adjacent an end face of said one end portion of said operation arm.

2. The saw-blade guard arrangement as defined in claim 1, wherein said first and second biasing means are disposed over said pivot shaft.

3. The saw-blade guard arrangement as defined in claim 1, wherein said adjusting means comprising a bolt, and a rib portion extending from said hinging member at a position adjacent said pivot shaft, said bolt threadingly engaged with said rib portion and being in abutment with said end face of said operation arm, axis of said bolt being spaced away from an axis of said pivot shaft, said end face being urged toward said bolt by said second biasing means.

4. The saw-blade guard arrangement as defined in claim 2, wherein said first biasing means has one end engaged with an inner face of a rear wall of said upper safety guard, and the other end engaged with a spring seat projecting from said hinging member.

5. The saw-blade guard arrangement as defined in claim 2, wherein said second biasing means has one end engaged with an inner face of a rear wall of said upper safety guard, and the other end engaged with a bottom wall of said operation arm.

* * * * *